United States Patent
Yun

(10) Patent No.: US 7,565,672 B2
(45) Date of Patent: Jul. 21, 2009

(54) METHOD FOR TRANSMITTING AND RECORDING USER PREFERENCE INFORMATION IN OPTICAL DISC DEVICE

(75) Inventor: Yeo Han Yun, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 730 days.

(21) Appl. No.: 10/980,337

(22) Filed: Nov. 4, 2004

(65) Prior Publication Data

US 2005/0111825 A1 May 26, 2005

(30) Foreign Application Priority Data

Nov. 4, 2003 (KR) .................. 10-2003-0077771

(51) Int. Cl.
*G06F 13/00* (2006.01)

(52) U.S. Cl. .................. 725/46; 725/9; 386/46

(58) Field of Classification Search .............. 386/46, 386/70, 95, 105, 124–126, 83; 360/13, 14.1, 360/27, 32; 369/48; 348/6, 7, 12, 13; 725/38, 725/44–46, 9, 35; 345/327–329, 352–357, 345/716, 723, 733, 741
See application file for complete search history.

(56) References Cited

U.S. PATENT DOCUMENTS

| | | | | |
|---|---|---|---|---|
| 5,664,046 A | * | 9/1997 | Abecassis | .................. 386/125 |
| 6,429,879 B1 | * | 8/2002 | Sturgeon et al. | .............. 715/723 |
| 2002/0056095 A1 | * | 5/2002 | Uehara et al. | .................. 725/38 |
| 2004/0049787 A1 | * | 3/2004 | Maissel et al. | ................. 725/46 |
| 2004/0062527 A1 | * | 4/2004 | Kuroda | ......................... 386/94 |
| 2006/0130097 A1 | * | 6/2006 | Lee et al. | ....................... 725/50 |

FOREIGN PATENT DOCUMENTS

KR   10-1997-0063211   9/1997

* cited by examiner

*Primary Examiner*—Thai Tran
*Assistant Examiner*—Mishawn Dunn
(74) *Attorney, Agent, or Firm*—Birch, Stewart, Kolasch & Birch, LLP

(57) ABSTRACT

A method for transmitting and recording user preference information when recording an optical disc. The method records user preference information, prestored in the optical disc player, which is associated with a first recording medium, onto a second recording medium, when copying data recorded on the first recording medium, such as a DVD-ROM, onto the second recording medium such as a DVD-RW. By this arrangement, a user need not manually control an optical disc device playing the second recording medium to set the individual user's preference information again.

31 Claims, 8 Drawing Sheets

FIG. 2

User Preference Information in memory

| | Contents |
|---|---|
| Disc_ID #1 | Audio_Language (korean) |
| | Sub-picture_Language (english) |
| | - - - |
| | PlayList (PlayList #n) |
| | Bookmark (entry point #m) |
| | - - - |
| Disc_ID #2 | Audio_Language (english) |
| | Sub-picture_Language (korean) |
| | - - - |
| | PlayList (PlayList #k) |
| | Bookmark (entry point #s) |

METHOD FOR TRANSMITTING AND RECORDING USER PREFERENCE INFORMATION IN OPTICAL DISC DEVICE

The present application claims, under 35 U.S.C. § 119, the priority benefit of Korean Patent Application No. P03-077771 filed Nov. 4, 2003, the entire contents of which are herein fully incorporated by reference.

BACKGROUND OF THE INVENTION

1. Field of the Invention

The present invention relates to a method for transmitting and recording user preference information in an optical disc device for copying data recorded on a first recording medium, such as a DVD-ROM (Digital Versatile Disc-Read Only Memory), onto a second recording medium, such as a DVD-RW (DVD-Rewritable).

2. Description of the Related Art

Recently, there has been developed an optical disc and an optical disc device capable of reproducing large amounts of high-quality video data and high-quality audio data. For example, a DVD-ROM and a DVD player, involving an optical disc, have become increasingly popular. DVD-RW's and a DVD recorder capable of recording large amounts of high-quality video data and high-quality audio data, have also become increasingly popular as a recording medium and recorder.

If the DVD player is connected to the DVD recorder, a DVD-ROM's content data, reproduced by the DVD player, can be copied and recorded on a DVD-RW seated in the DVD recorder. Therefore, a user can easily copy and record various content data, such as movie data stored in the DVD-ROM on the DVD-RW. A variety of user information can be stored in a nonvolatile memory, such as a flash memory or an EEPROM (Electrically Erasable and Programmable Read Only Memory), contained in the DVD player in such a way that data of the DVD-ROM can be more effectively reproduced. For example, the memory may store a user's desired audio language from among a plurality of possible audio languages provided on the DVD-ROM, a user's desired sub-picture language from among a plurality of sub-picture languages, and a specific playlist and/or bookmark information selected by the user in the form of user preference information.

The user preference information can be associated with a disc ID serving as unique ID information assigned to the DVD-ROM. In this manner, the user preference information can be recorded in the memory of the DVD player, while being classified according to the disc ID. However, in accordance with the related art, the user preference information stored in the memory of the DVD player is not sent to DVD recorder. Hence, the user who later plays the DVD-RW must manually control the DVD player containing the DVD-RW to set their individual user preference information again.

SUMMARY OF THE INVENTION

Therefore, it is an object of the present invention to address one or more of the above problems. It is an object of the present invention to provide a method for transmitting and recording user preference information in an optical disc device. In other words, user preference information, pre-stored in an optical disc player device and associated with a first recording medium is transmitted along with the contents data. The contents data and user preference information are recorded on a second recording medium, DVD-RAM, DVD+R, DVD-R, etc.

In accordance with one aspect of the present invention, the above and other objects can be accomplished by a method for transmitting user preference information in an optical disc apparatus, comprising the steps of: a) searching for user preference information, associated with a recording medium to be copied, in a memory of the optical disc apparatus, and reading any discovered user preference information; and b) transmitting the read user preference information along with content data of the recording medium.

In accordance with another aspect of the present invention, there is provided a method for recording user preference information in an optical disc apparatus, comprising the steps of: a) receiving content data to be copied, and recording the received content data in a recordable recording medium; and b) recording, in a predetermined area of the recordable recording medium, user preference information, read from a memory of a transmission apparatus, which is associated with the content data.

In accordance with yet another aspect of the present invention, there is provided a method for updating and recording user preference information in a data storage unit, comprising the steps of: a) receiving digital data and its associated user preference information; and b) updating the received user preference information based upon a recording medium's position where the received digital data is to be recorded.

As a practical example summarizing the present invention, consider the following scenario. A DVD ROM can have many audio languages stored thereon for a user to select from (e.g. up to eight audio language). For example, the movie "Jaws" could allow a user to select between the audio languages of:
1) English,
2) Korean,
3) Spanish, or
4) German.

Also, the same movie "Jaws" could allow a user to select between many different "closed captioning languages," sometimes referred to as "sub-picture languages" (e.g. up to thirty-two sub-picture languages) . For example, the movie "Jaws" could allow the user to select between the following closed captioning languages:
1) None
2) English
3) Korean
4) Spanish, or
5) German.

When the user puts the DVD movie "Jaws" into a DVD player and plays the movie. The user may select the English audio language and the Korean sub-picture language. The DVD player stores the ID of the DVD ROM having the "Jaws" movie thereon and also stores the two selected languages in a memory of the DVD player, as user preference information. The above process could be repeated several times for many different movies, so that the memory in the DVD player would contain the following information:

| ID | Audio | Sub-picture data |
|---|---|---|
| Jaws | English | Korean |
| ET | Korean | none |
| Star Wars | English | Korean |
| T2 | German | Korean |

Every time the user inserts a disc in the DVD player, the DVD player automatically reads the DVD ID and searches the memory to see if any user preference information has been stored for that movie. If so, the DVD player defaults to the user's previous settings for that movie.

In accordance with the present invention, whenever the movie is played, the stored user preference data for that movie is transmitted along with the movie data (such as before the movie data or after the movie data). If the movie is being played on a TV, the user preference data is simply ignored by the TV. However, if the movie data is being sent to a DVD recorder, the user preference data is recognized by the DVD recorder and is recorded on the DVD-RW being recorded.

When copying a DVD ROM to a DVD-RW all of the content of the DVD-ROM may be copied to the DVD-RW (e.g., up to eight different audio languages and up to thirty two different sub-picture languages). For example, if copying the movie JAWS, all of the audio languages (English, Korean, Spanish and German) would be recorded on the DVD-RW. Also, all of the sub-picture languages would be recorded on the DVD-RW. However, when the DVD-RW (with JAWS recorded thereon) is later inserted into a DVD player. The DVD player would read the user preference information stored on the DVD-RW in the navigation data area, and the DVD player would default to the English audio language and the Korean closed captioning language, because this was how the movie (when previously played by the user as a DVD ROM), was preferred to be viewed by the user.

Although the playing of the DVD-RW, having the movie JAWS recorded thereon, will default to English-Korean, it would be possible for the user to enter a "menu" option and select a different audio language and/or a different sub-picture language.

The user preference information could also include audio format information preferred for the movie, e.g. Dolby surround, Dolby Digital 5.1, stereo, PCM, DTS, etc. Further, the user preference information could include a list of favorite chapters within the movie, such as chapters 1, 5 and 16. Further, the user preference information could include a list of favorite bookmarks, such as a funny scene at 45 minutes and 16 seconds and a shootout at 69 minutes and 10 seconds.

Master default user preferences may be established by the system. For example, if a user is about to play a DVD ROM, and the memory 14 is checked and there is no user preference information stored therein associated with the movie's ID, the system could assign default user preference information for that movie (for example, English-Korean). The default user preference information could be based upon the previously stored user preference information. For example, as listed above, English was chosen the most for the audio language and Korean was chosen the most for the sub-picture language. Therefore, the player would choose these user preference options, unless the user intervenes to select different user preference options. Also, the default or master preference settings could be directly set by the user as an input to the DVD player. For example, a menu option on the DVD player could be "set default user preferences".

BRIEF DESCRIPTION OF THE DRAWINGS

The above and other objects, features and other advantages of the present invention will be more clearly understood from the following detailed description taken in conjunction with the accompanying drawings, in which:

FIG. 2 is a structural diagram illustrating user preference information stored in a memory of the optical disc device, in accordance with the present invention;

DETAILED DESCRIPTION OF PREFERRED EMBODIMENTS

Figure 1:
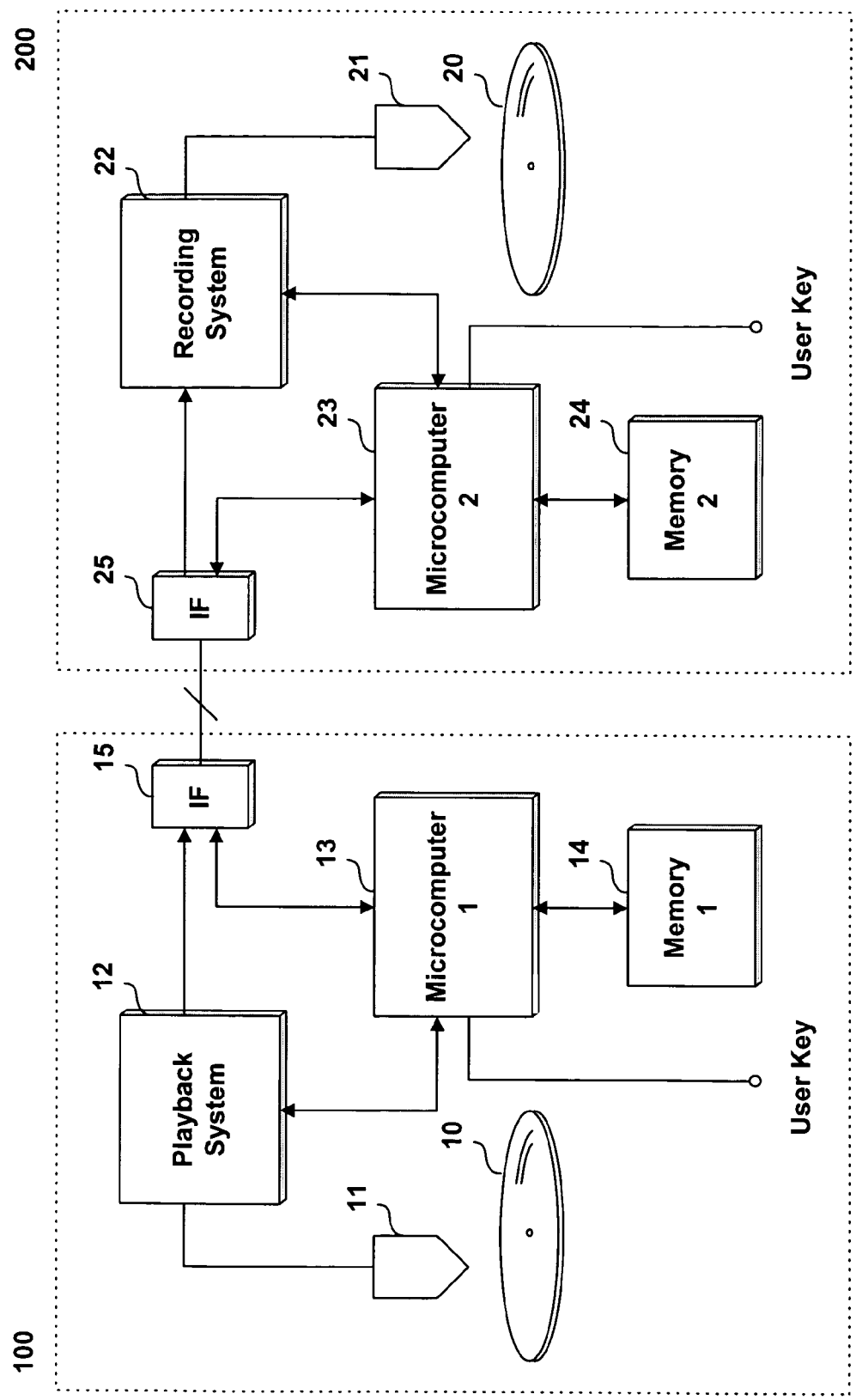
FIG. 1 is a block diagram illustrating a connection state between optical disc devices, in accordance with the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

A method for transmitting/recording user preference information according to the present invention is applicable to a DVD player and a DVD recorder, etc. Referring to FIG. 1, the DVD player 100 includes an optical pickup unit 11, a playback system 12, a microcomputer 13, a memory 14, and an interface 15, etc. The DVD recorder 200 includes an optical pickup unit 21, a recording system 22, a microcomputer 23, a memory 24, and an interface (IF) unit 25, etc.

The DVD player 100 and the DVD recorder 200 are connected to each other via the interface units 15 and 25, as shown in FIG. 1. The DVD player 100 reads data recorded on the DVD-ROM 10 seated therein, and transmits the read data. The DVD recorder 200 receives data from the DVD player 100, and performs a series of disc copy operations for recording the received data on the DVD-RW 20 seated therein.

The memory 14 contained in the DVD player stores user preference information associated with disc ID information. The user preference information is classified according to the disc ID information, as shown in FIG. 2. For example, user preference information associated with a first disc ID "Disc_ID#1" may be composed of audio language information of the Korean language and English sub-picture (or closed captioning) language information desired by a user, etc. In addition, the user preference information may further include N-th playlist information and bookmark information of an M-th entry point desired by the user. For example, the memory could contain the users favorite play list of chapters (e.g., chapters 1, 2, 17 and 22) and also the user's favorite scenes (e.g., bookmarks saved as entry points at 2:11 minutes/seconds and 101:10 minutes/seconds).

Figure 3:
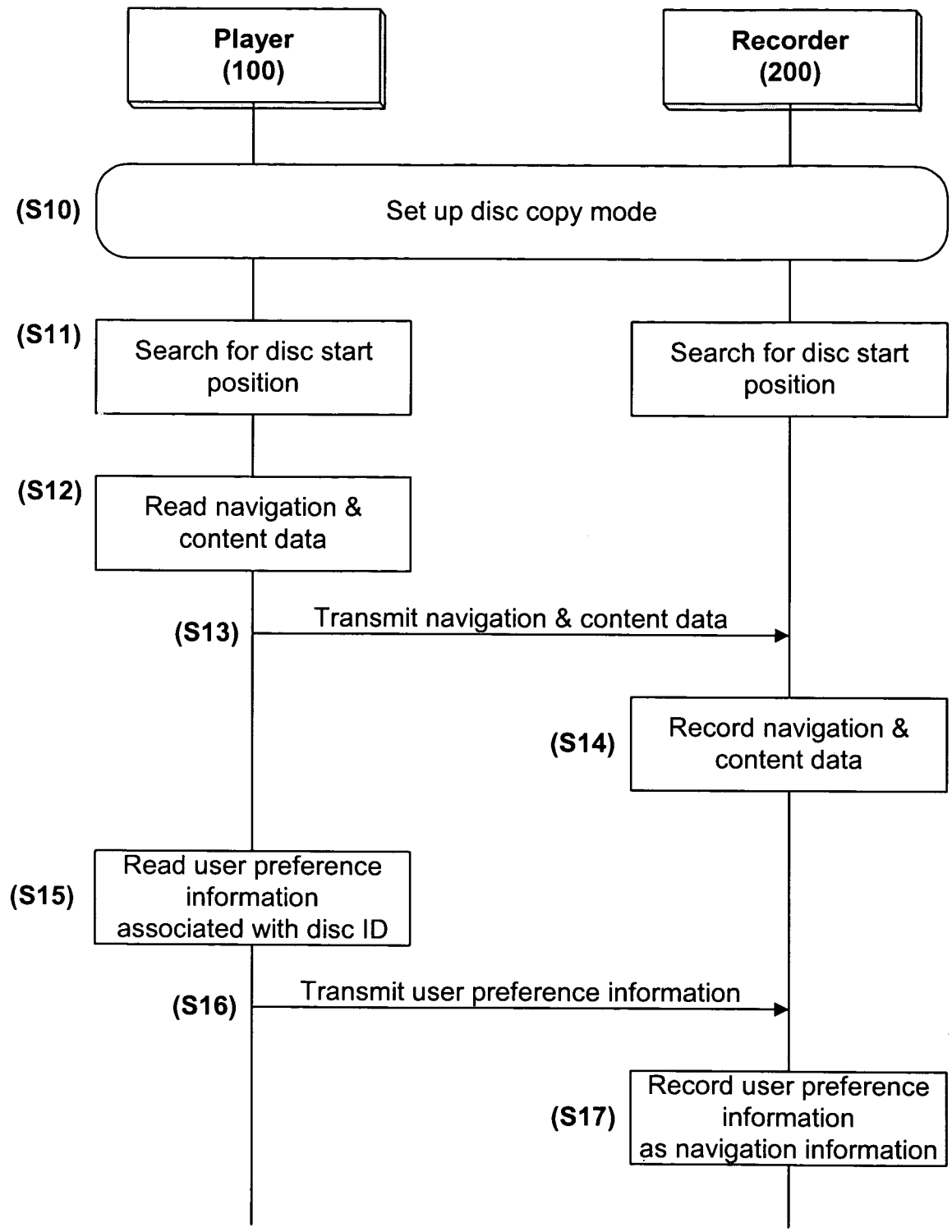
FIG. 3 is a flow chart illustrating a method for transmitting/recording user preference information in the optical disc device, in accordance with the present invention.

Referring to FIG. 3, provided that the user commands the DVD player 100 and the DVD recorder 200 to perform a hard-copy operation for copying data from the DVD-ROM 10 to the DVD-RW 20, the DVD player 100 and the DVD recorder 200 each set up a disc copy mode at step S10.

The DVD player 100 searches for a start recording position of the DVD-ROM 10, and the DVD recorder 200 searches for a start recording position of the DVD-RW 20 at step S11. The DVD player 100 performs a series of playback operations for reading navigation information and content data from the start recording position of the DVD-ROM 10 at step S12.

The DVD recorder 200 receives navigation information and content data from the DVD player 100 at step S13, and performs a series of recording operations for recording the received data from the start recording position of the DVD-RW 20 at step S14.

If the DVD player 100 reads all of the navigation information and the content data recorded on the DVD-ROM 10, and transmits the read data, it determines whether user preference information stored in the memory 14 contains specific user preference information associated with a unique disc ID assigned to the DVD-ROM 10.

If so, the DVD player 100 reads the user preference information associated with the disc ID of the DVD-ROM 10 at step S15, and transmits the read information to the DVD recorder 200 at step S16. The DVD recorder 200 temporarily stores the user preference information transferred from the DVD player 100, and records the received information on the DVD-RW 20 in the form of navigation information of the DVD-RW 20 at step S17.

Figure 4:
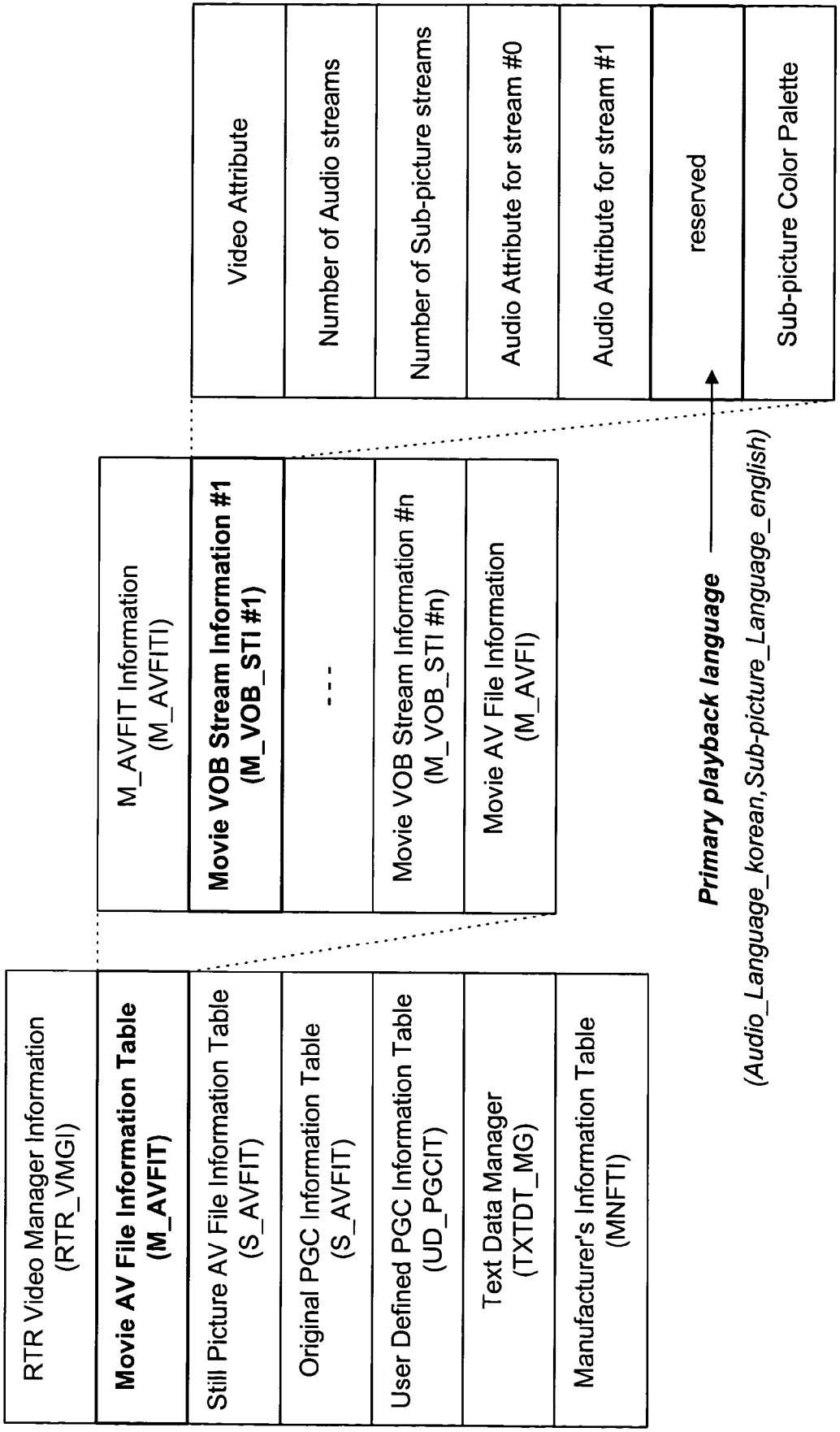
FIGS. 4 and 5 are structural diagrams illustrating user preference information recorded in the form of navigation information, in accordance with the present invention.

For example, as shown in FIG. 4, audio language information and sub-picture language information from among user preference information received from the DVD player 100 may be recorded, as primary playback language information, in a reserved area of movie VOB (Video Object) stream information contained in a movie A/V file information table "M_AVFIT" from among navigation information of the DVD-RW 20.

Therefore, referring to the primary playback language information recorded in the form of the navigation information, the optical disc device for reproducing data copied/recorded on the DVD-RW 20 can selectively reproduce a user-desired specific language, for example, audio information configured in the form of the Korean language and close captioning information configured in the form of the English language.

Figure 5:
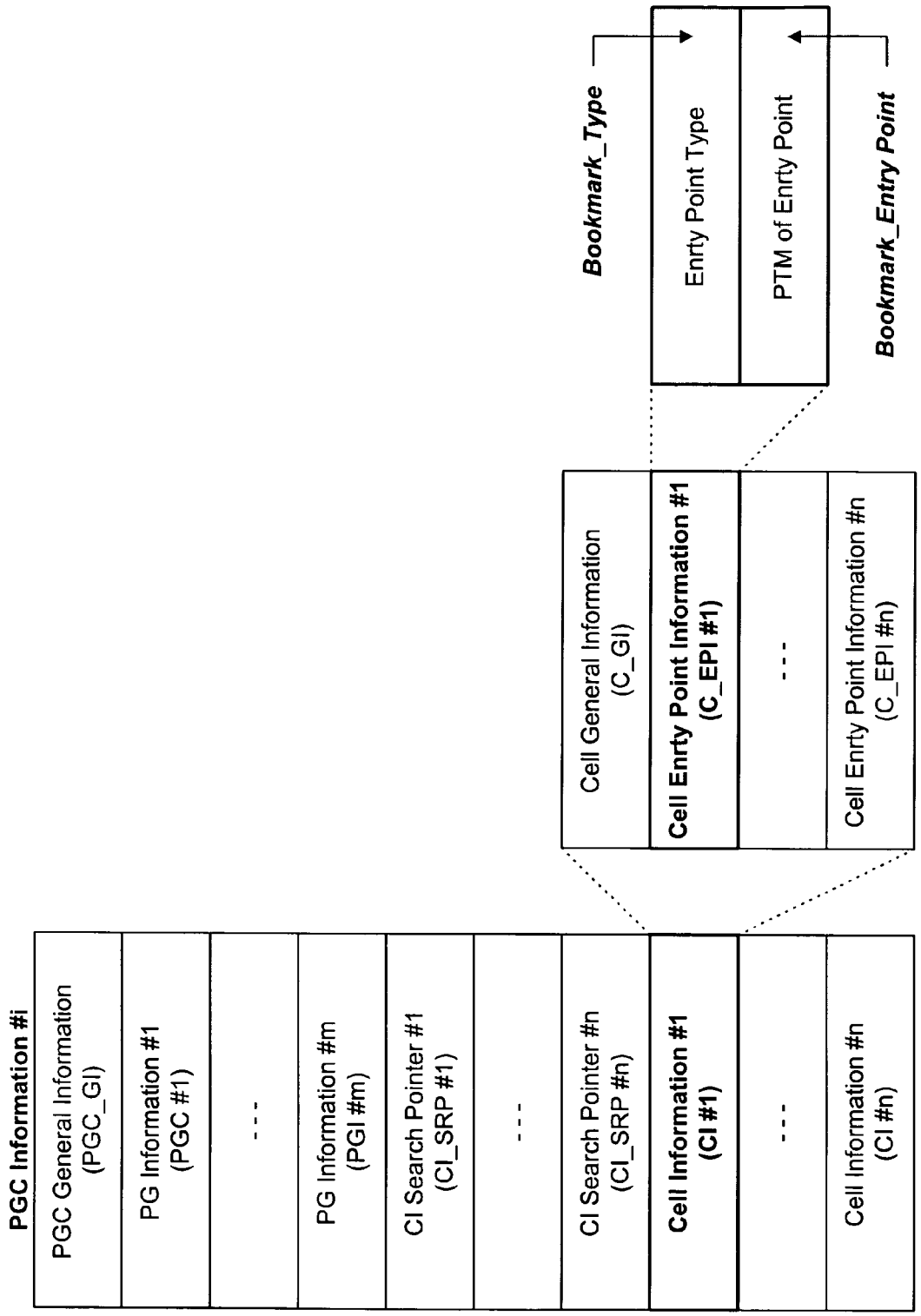

Referring to FIG. 5, the bookmark information from among user preference information received from the DVD player is recorded in a cell entry point information area "C_EPI" of a cell information area "CI" contained in program chain information "PGC_information" from among the navigation information of the DVD-RW 20. Entry point type information contained in the cell entry point information area "C_EPI" can be recorded with a bookmark type. Presentation time information of the entry point can be recorded with a bookmark entry point.

Therefore, referring to entry point bookmark information recorded in the form of such navigation information, the optical disc device for reproducing data copied/recorded on the DVD-RW 20 can quickly access a specific recording position selected by the user, i.e., a user-desired specific recording position.

Figure 6:
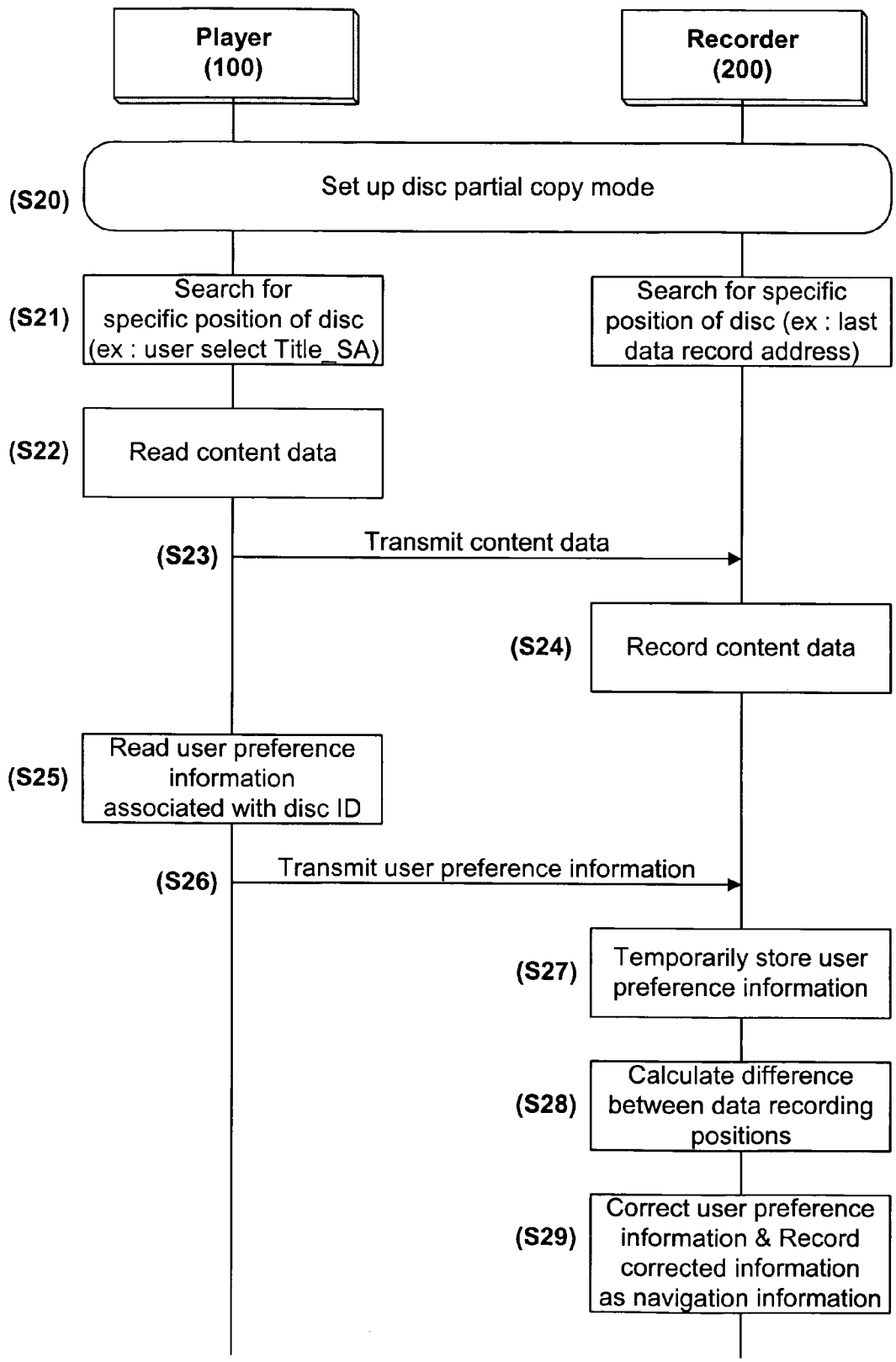
FIG. 6 is a flow chart illustrating a method for transmitting/recording user preference information in the optical disc device, in accordance with an alternative embodiment of the present invention.

In accordance with another preferred embodiment of the present invention, if the user commands the DVD player 100 and the DVD recorder 200 to perform a disc copy operation for partially copying some data of the DVD-ROM 10 into a predetermined area of the DVD-RW 20 as shown in FIG. 6, the DVD player 100 and the DVD recorder 200 each set up a disc partial copy mode at step S20.

The DVD player 100 searches for a specific recording position such as a title position desired by the user from among a plurality of recording positions of the DVD-ROM 10. The DVD recorder 200 searches for either a user-desired recording position or a specific recording position where the last data is recorded from among a plurality of recording positions of the DVD-RW 20 at step S21. Thereafter, the DVD player 100 performs a series of playback operations for reading content data from the specific recording position of the searched DVD-ROM at step S22.

The DVD recorder 200 receives content data from the DVD player 100 at step S23, and performs a series of recording operations for recording the read content data from the specific recording position of the searched DVD-RW 20 at step S24.

If the DVD player 100 reads all of the content data from the specific recording position of the DVD-ROM 10, and transmits it, it determines whether user preference information stored in the memory 14 contains specific user preference information associated with a unique disc ID assigned to the DVD-ROM 10.

The DVD player 100 reads the user preference information associated with the disc ID of the DVD-ROM 10 at step S25, and transmits the read information to the DVD recorder 200 at step S26. The DVD recorder 200 temporarily stores the user preference information transferred from the DVD player 100 in the memory 24 at step S27.

The DVD recorder 200 calculates a difference between a recording position of the content data copied/recorded at the specific recording position of the DVD-RW 20 and a recording position of the content data recorded on the DVD-ROM 10, and converts the difference into an offset value between a source recording position and a copy recording position of the content data at step S28.

The DVD recorder 200 selects user preference information associated with the content data recording position from among the temporarily-stored user preference information, corrects the selected user preference information by the offset value, and records the corrected information in the form of navigation information associated with the recording position of the copied content data at step S29.

Figure 7:
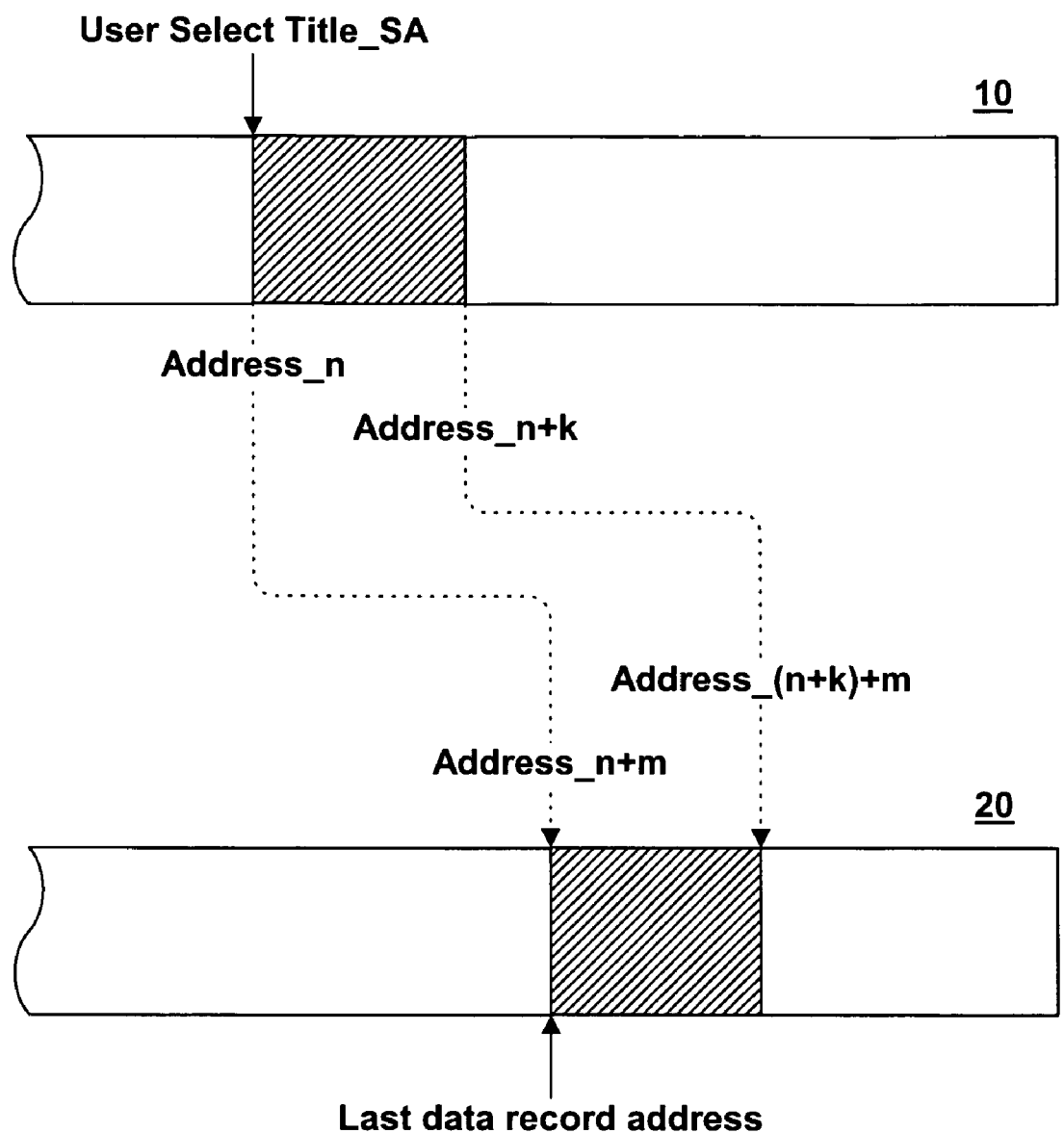
FIG. 7 is a structural diagram illustrating a plurality of recording areas of data read/recorded by a disc partial copy operation, in accordance with an alternative embodiment of the present invention.

For example, content data recorded in a partial recording area "Address_n~n+k" of the DVD-ROM 10 can be recorded in another partial recording area "Address_n+m~(n+m)+k" of the DVD-RW 20, as shown in FIG. 7. In this case, it should be noted that an offset value between a source recording position and a copy recording position of the content data is set to "m".

Figure 8:
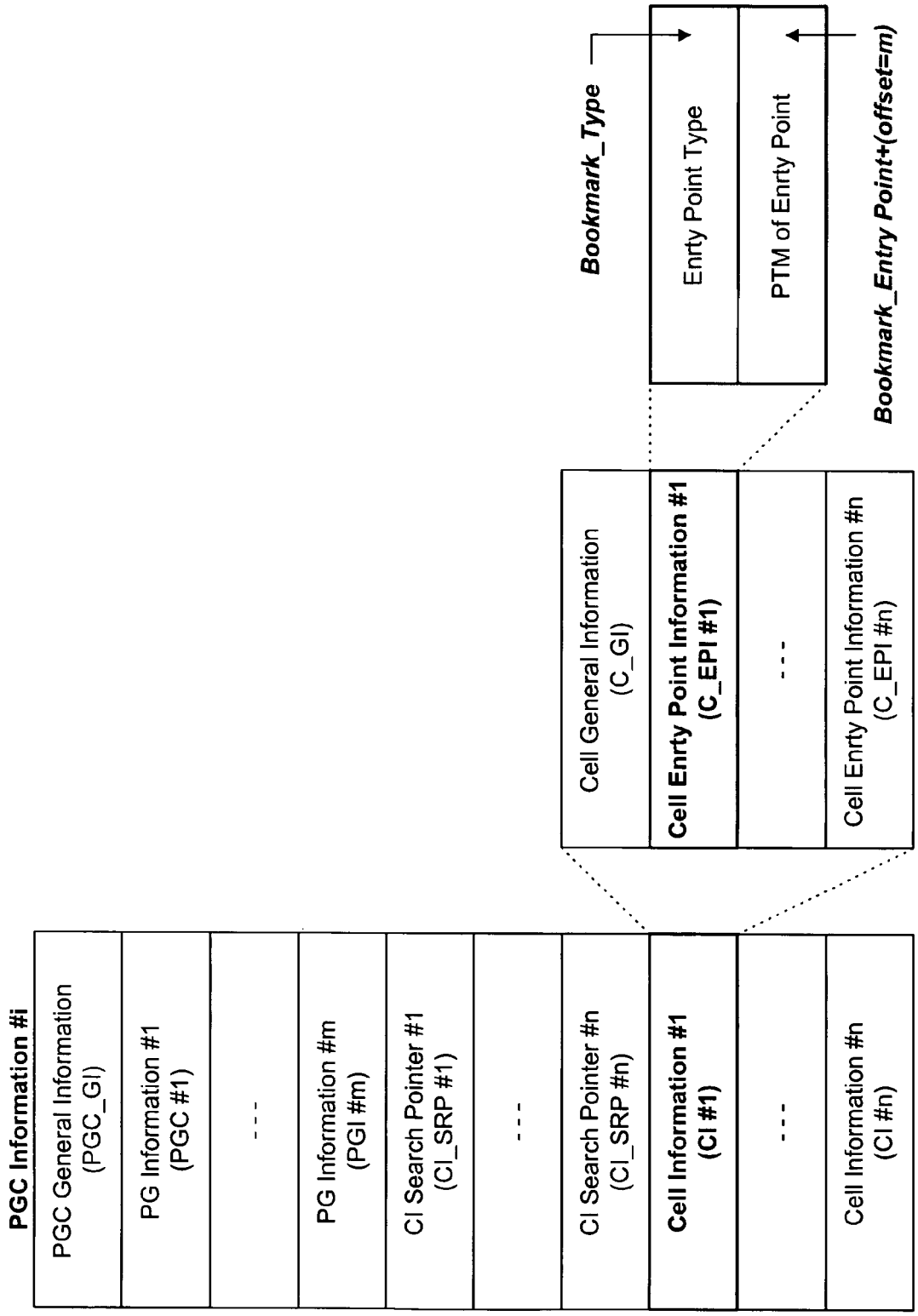
FIG. 8 is a structural diagram illustrating user preference information recorded in the form of navigation information, in accordance with an alternative embodiment of the present invention.

In the meantime, user preference information associated with a recording position of the content data, for example, bookmark information, is recorded in a cell entry point information area "C_EPI" of a cell information area "CI" contained in program chain information "PGC_Information" from among navigation information of the DVD-RW 20, as shown in FIG. 8. Entry type information contained in the cell entry point information area "C_EPI" is recorded with a bookmark type. The presentation time information of the entry point can be recorded with an entry point presentation time value, which is a bookmark entry point added to the offset value "m" between the source recording position and the copy recording position of the content data.

Therefore, referring to bookmark entry point information recorded in the form of such navigation information, the optical disc device for reproducing data partially copied/recorded on the DVD-RW 20 can quickly and normally access a DVD-RW's copy recording position corresponding to a DVD-ROM's specific recording position pre-selected by the user.

User preference information read and transferred from the memory 14 of the DVD player 100 can be transmitted separately from content data, before or after, a transmission time of the content data. The user preference information may also include much more user selection information, if needed.

The present invention is applicable to other recording media other than the DVD-ROM and the DVD-RW, and is also applicable to other players and recorders other than the DVD player and the DVD recorder.

As apparent from the above description, in accordance with the method for transmitting and recording user preference information in an optical disc device according to the present invention, in the case of copying data recorded on a first recording medium onto the second recording medium, there is no need for a user to manually control an optical disc device containing the second recoding medium to set individual user preference information again.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transmitting user preference information and content data from a medium player, the method comprising:
   searching in a memory of the medium player for user preference information;
   reading the user preference information;
   transmitting the user preference information along with content data on a first medium included in the medium player to a second medium in a medium recorder configured to communicate with the medium player; and
   recording the transmitted user preference information and the transmitted content data onto the second medium in the medium recorder such that a user does not have to reenter the user preference information when playing the content data on the second medium,
   wherein the user preference information is automatically modified prior to being recorded onto the second medium based upon a recording position on the second medium wherein the content data will be recorded.

2. The method according to claim 1, wherein said searching step includes searching in the memory of the medium player for user preference information associated with the content data on the first medium to be read or played by the medium player,
   wherein said reading step includes reading any found user preference information associated with the content data on the first medium to be read or played, and
   wherein said transmitting step includes transmitting the found user preference information along with the content data on the first medium of the medium player.

3. The method according to claim 2, wherein if no associated user preference information is discovered in the memory, default user preference information is read from the memory.

4. The method according to claim 1, wherein the content data of the first medium is audio-visual data associated with a movie, and
   wherein the user preference information includes a preferred audio language and a preferred closed captioning language.

5. The method according to claim 1, wherein the user preference information is transmitted before the content data.

6. The method according to claim 1, wherein the user preference information is transmitted after the content data.

7. The method according to claim 1, further comprising:
   if no user preference information is found in the memory of the medium player, receiving user preference information from a user;
   associating the received user preference information with identification information of the first medium; and
   storing the received user preference information and identification information of the first medium in the memory of the medium player.

8. The method according to claim 1, further comprising:
   if no user preference information is found in the memory of the medium player, checking for default user preference information stored in the memory of the medium player;
   associating the default user preference information with identification information of the first medium; and
   storing the default user preference information and the identification information of the first medium in the memory of the medium player.

9. The method according to claim 1, wherein the user preference information includes at least one of a user's desired audio language, closed captioning language, audio encoding format, play list, and entry point information.

10. The method according to claim 1, wherein the memory of the medium player is a nonvolatile memory.

11. The method according to claim 1, wherein the first medium is an optical disc.

12. A method for recording user preference information and content data on a recording medium, comprising:
    receiving, at a medium recorder, content data to be copied onto the recording medium from a medium player configured to communicate with the medium recorder;
    receiving user preference information associated with the content data transmitted from the medium player;
    recording the received content data on the recording medium; and
    recording, in a predetermined area of the recording medium, the received user preference information such that a user does not have to reenter the user preference information when playing the content data on the recording medium,
    wherein the user preference information is automatically modified prior to being recorded in the predetermined area based upon a recording position on the recording medium wherein the content data will be recorded.

13. The method according to claim 12, wherein the user preference information includes at least one of a play list and an entry point.

14. The method according to claim 12, wherein the predetermined area of the recording medium is in a reserved area for management information.

15. The method according to claim 12, wherein the content data of the recording medium is audio-visual data associated with a movie, and wherein the user preference information includes a preferred audio language and a preferred closed captioning language.

16. The method according to claim 12, wherein the user preference information is received before the content data.

17. The method according to claim 12, wherein the user preference information is received after the content data.

18. The method according to claim 12, wherein the user preference information includes at least one of a user's desired audio language, closed captioning language, audio encoding format, play list, and entry point information.

19. The method according to claim 12, wherein the recording medium is an optical disc.

20. A medium player comprising:
- a playback system for reading content data recorded on a first medium;
- a memory;
- a controller for searching said memory to discover user preference information, said controller reading the user preference information; and
- an output interface transmitting and recording the content data and the user preference information onto a medium recorder having a second medium and being configured to communicate with the medium player such that a user does not have to reenter the transmitted user preference information when playing the content data recorded on the second medium,
- wherein the user preference information is automatically modified prior to being recorded onto the second medium based upon a recording position on the second medium wherein the content data will be recorded.

21. The medium player according to claim 20, wherein said playback system reads identification information from the first medium, and
- wherein said controller searches said memory to discover if user preference information, associated with the first medium's identification information, has been previously stored in said memory, and if any associated user preference information is found, said controller reading the associated user preference information and transmitting the associated user preference information as the user preference information to the medium recorder.

22. The medium player according to claim 21, wherein if no associated user preference information is found in said memory, said controller transmits default user preference information stored in said memory as said user preference information.

23. The medium player according to claim 20, wherein the content data of the first medium is audio-visual data associated with a movie, and
- wherein the user preference information includes a preferred audio language and a preferred closed captioning language.

24. The medium player according to claim 20, wherein the user preference information includes at least one of a user's desired audio language, closed captioning language, audio encoding format, play list, and entry point information.

25. The method medium player according to claim 20, wherein the first medium is an optical disc.

26. A medium recorder comprising:
- an input interface for receiving content data from a medium player and user preference information, associated with the content data, from the medium player;
- a recording system for recording the content data and the user preference information on a recording medium; and
- a controller for causing said user preference information to be recorded in a predetermined area of the recording medium such that a user does not have to reenter the user preference information for the recorded content data,
- wherein the user preference information is automatically modified prior to being recorded in the predetermined area based upon a recording position on the recording medium wherein the content data will be recorded.

27. The medium recorder according to claim 26, further comprising:
- a memory,
- wherein the user preference information is stored in said memory prior to being recorded on the recording medium.

28. The medium recorder according to claim 26, wherein the predetermined area of the recording medium is a reserved area for management information.

29. The medium recorder according to claim 26, wherein the content data of the recording medium is audio-visual data associated with a movie, and
- wherein the user preference information includes a preferred audio language and a preferred closed captioning language.

30. The medium recorder according to claim 26, wherein the user preference information includes at least one of a user's desired audio language, closed captioning language, audio encoding format, play list, and entry point information.

31. The method medium recorder according to claim 26, wherein the medium is an optical disc.

* * * * *